US011529855B2

(12) United States Patent
Kauffman

(10) Patent No.: US 11,529,855 B2
(45) Date of Patent: Dec. 20, 2022

(54) REMOVABLE ROOF VENT

(71) Applicant: Heng's Industries (USA), LLC, Elkhart, IN (US)

(72) Inventor: Robert Kauffman, Elkhart, IN (US)

(73) Assignee: HENG'S INDUSTRIES (USA), LLC, Elkhart, IN (US)

( * ) Notice: Subject to any disclaimer, the term of this patent is extended or adjusted under 35 U.S.C. 154(b) by 155 days.

(21) Appl. No.: 17/190,572

(22) Filed: Mar. 3, 2021

(65) Prior Publication Data
US 2022/0281298 A1 Sep. 8, 2022

(51) Int. Cl.
| | |
|---|---|
| B60J 7/16 | (2006.01) |
| B60H 1/24 | (2006.01) |
| B60J 10/82 | (2016.01) |
| B60J 10/84 | (2016.01) |
| E05F 11/14 | (2006.01) |
| E05F 11/18 | (2006.01) |
| B60P 3/32 | (2006.01) |

(52) U.S. Cl.
CPC ............ B60J 7/1642 (2013.01); B60H 1/245 (2013.01); B60J 10/82 (2016.02); B60J 10/84 (2016.02); E05F 11/145 (2013.01); E05F 11/18 (2013.01); B60P 3/32 (2013.01)

(58) Field of Classification Search
CPC .......... B60J 7/1642; B60J 10/82; B60J 10/84; B60H 1/245; B60H 1/262; E05F 11/18; E05F 11/145; B60P 3/32

USPC .......... 296/216.02, 216.03, 168, 180.4, 156, 296/96.11, 217; 454/136, 275; 49/394, 49/402

See application file for complete search history.

(56) References Cited

U.S. PATENT DOCUMENTS

| | | | | |
|---|---|---|---|---|
| 2,372,164 | A | * 3/1945 | Woodhams | ............ B60H 1/262 454/94 |
| 3,934,383 | A | * 1/1976 | Perry | .................. E04D 13/0352 49/342 |
| 4,615,263 | A | * 10/1986 | Titterud | ................. B60J 7/1642 454/94 |
| 2008/0139101 | A1 | 6/2008 | Bickel et al. | |
| 2015/0140916 | A1 | 5/2015 | Bickel | |
| 2018/0105020 | A1 | 4/2018 | Smith et al. | |

* cited by examiner

Primary Examiner — Dennis H Pedder
Assistant Examiner — Joyce Eileen Hill
(74) Attorney, Agent, or Firm — Botkin & Hall, LLP

(57) ABSTRACT

A vent for mobile living quarters has a base and a cover coupled to the base. The cover is connected to the base and pivots about a hinge by a mechanism that is coupled to a moving bar. The moving bar is attached to the cover by fasteners on one end and an alignment tab on the opposite end. The cover is user-replaceable from the top side without having to move or disconnect the mechanism. To replace the cover, fasteners are removed and the cover is pivoted away from the moving bar, where the alignment tab disengages from the cover. The cover is then slidable along the hinge to completely remove the cover from the base. A new replacement cover is slid along the hinge and the alignment tab is engaged with the replacement cover. The cover is pivoted down to a closed position and the fasteners are reinstalled.

18 Claims, 5 Drawing Sheets

REMOVABLE ROOF VENT

BACKGROUND OF THE INVENTION

This present disclosure relates to roof vents for mobile living quarters, such as a trailer, motor home, mobile home, or recreational vehicle (RV). Roof vents are typically made up of a translucent plastic cover that is mounted to a base through a hinge and a mechanism. The base is permanently affixed to the RV and sealed to the roof. The mechanism moves the cover about the hinge between an open and closed position. In the open position, air can pass through to provide fresh air to the interior of the living quarters, and in the closed position, air cannot pass through. Because the roof vent is mounted to the roof, the cover is constantly exposed to the elements, including the sun, which degrades the material over time. This leads to cracks or breakage, which can cause the roof vent to leak. Other times, weather, storm damage, or falling items break the cover. Replacing the cover becomes inevitable if the user owns the RV long enough. Replacing the entire vent assembly is impractical, expensive, and can create new places for water to leak. Replacing just the cover is the preferred method. Some inventions attempt to make this inevitable replacement task simple, but involve needing easy access from both sides, with multiple trips up and down from the roof of the RV to complete the replacement. They also require the removal of fasteners that are overhead, with the high potential for lost fasteners when one falls during disassembly and bounces out of sight. An improved vent cover with easy replacement is needed.

SUMMARY OF THE INVENTION

The present disclosure describes a user-replaceable vent cover that can be replaced without disassembly of the mechanism or needing to travel from the roof to the inside of the mobile living quarters. The vent cover is replaceable with only access to the roof side of the vent. The vent has a base that is affixed to the roof of the mobile living quarters and the cover moves between an opened and closed position through a mechanism. In the closed position, the cover is sealed to the base and in biased contact with a resilient seal. In the opened position, the cover is away from the base and air can pass through the vent. Replacing the cover is as simple as getting onto the roof of the mobile living quarters, removing two fasteners, pivoting the cover away from the base and sliding the cover off of the base-mounted hinge. The replacement can be performed without disturbing the mechanism, removing interior parts, or unscrewing overhead fasteners.

DESCRIPTION OF THE PREFERRED EMBODIMENT

Figure 1:
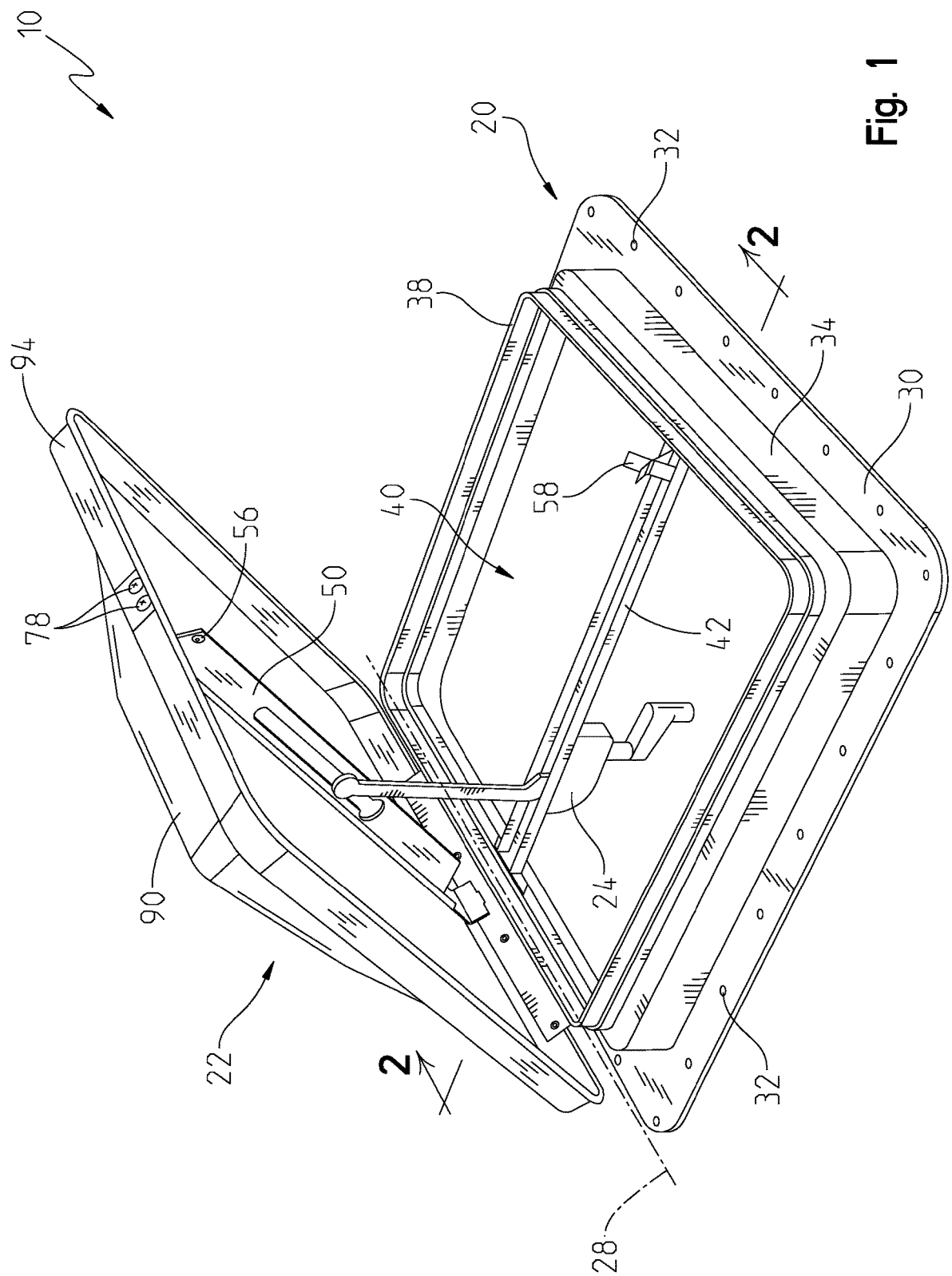
FIG. 1 is a perspective view of the vent in the open position.

A vent 10 is shown in FIGS. 1-6 and is designed to be mounted to the roof of mobile living quarters (not shown). The vent 10 has a base 20 that is affixed and sealed to the roof, a replaceable cover 22, and a mechanism 24 that moves the cover 22 between an opened and closed position about a hinge 26 having a hinge axis 28.

The base 20 is shown as formed from stamped and formed sheet metal, but other materials are contemplated. The base 20 has a flat mounting flange 30 with holes 32. The mounting flange 30 surrounds an upstanding wall 34. At the top of the upstanding wall 34 is a top edge 36 that holds a resilient seal 38. The upstanding wall 34 surrounds an opening 40 where air can pass through when the cover 22 is open. The upstanding wall 34 and flange 30 are formed to be one component to reduce the possibility of leaks. Affixed to opposite sides of the upstanding wall 34 is a fixed bar 42, which extends across and interrupts the opening 40. The mechanism 24 is affixed to the fixed bar 42 and has an actuating arm 44 and a handle 46. Turning the handle 46 moves the actuating arm 44 between a closed position, shown in FIG. 3, and an open position, shown in FIG. 2. The actuating arm 44 is coupled to a moving bar 50, in particular a pin 48 on the end of the actuating arm 44 slides in a channel 52 in the moving bar 50. The channel 52 has a larger end 54 which allows the pin 48 to be coupled to the channel 52 during the manufacturing process, but the pin does not reach the larger end 54 during normal use and therefore stays captured to the channel 52.

Figure 2:
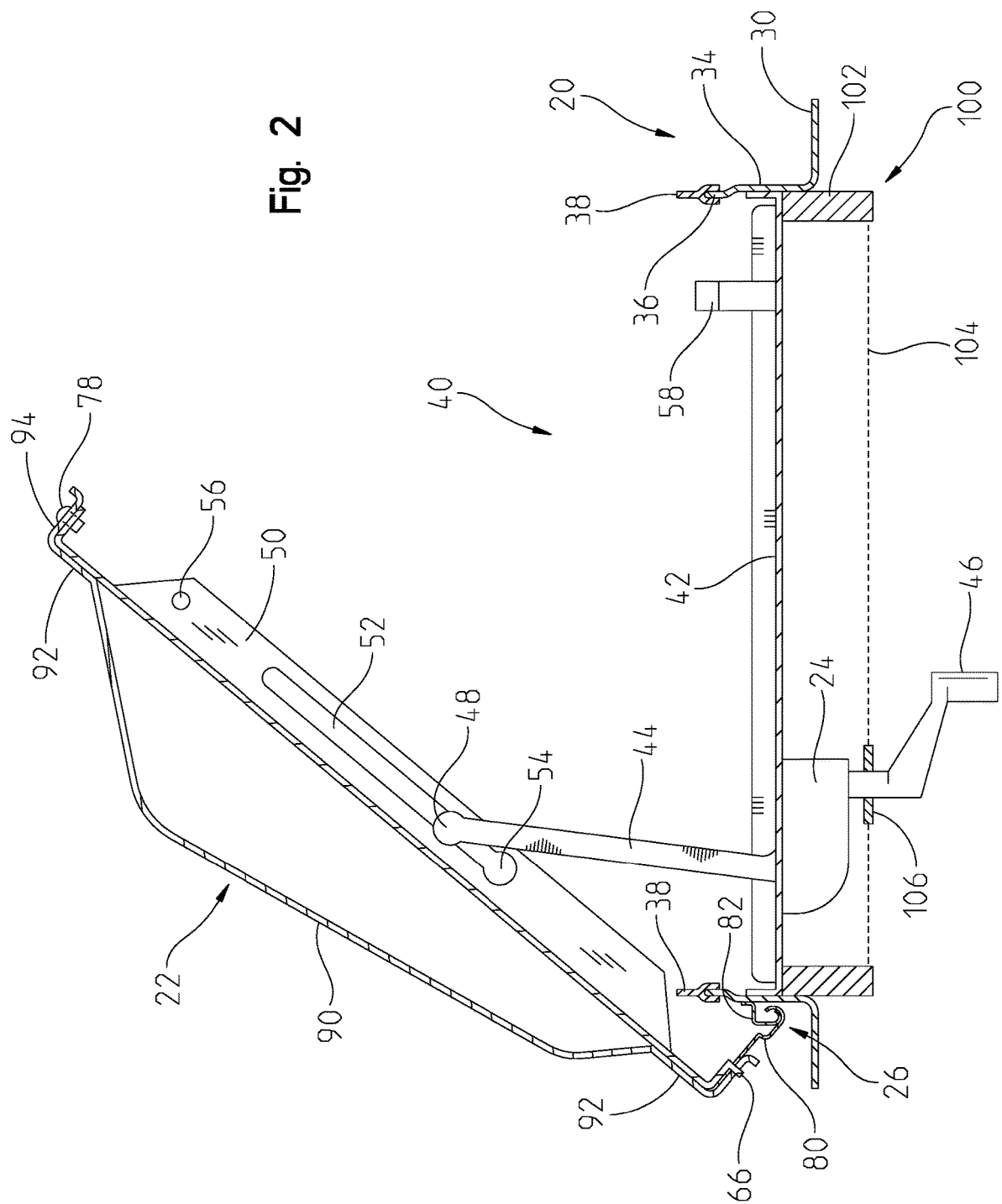
FIG. 2 is a side section view 2-2 of the vent in FIG. 1.
Figure 3:
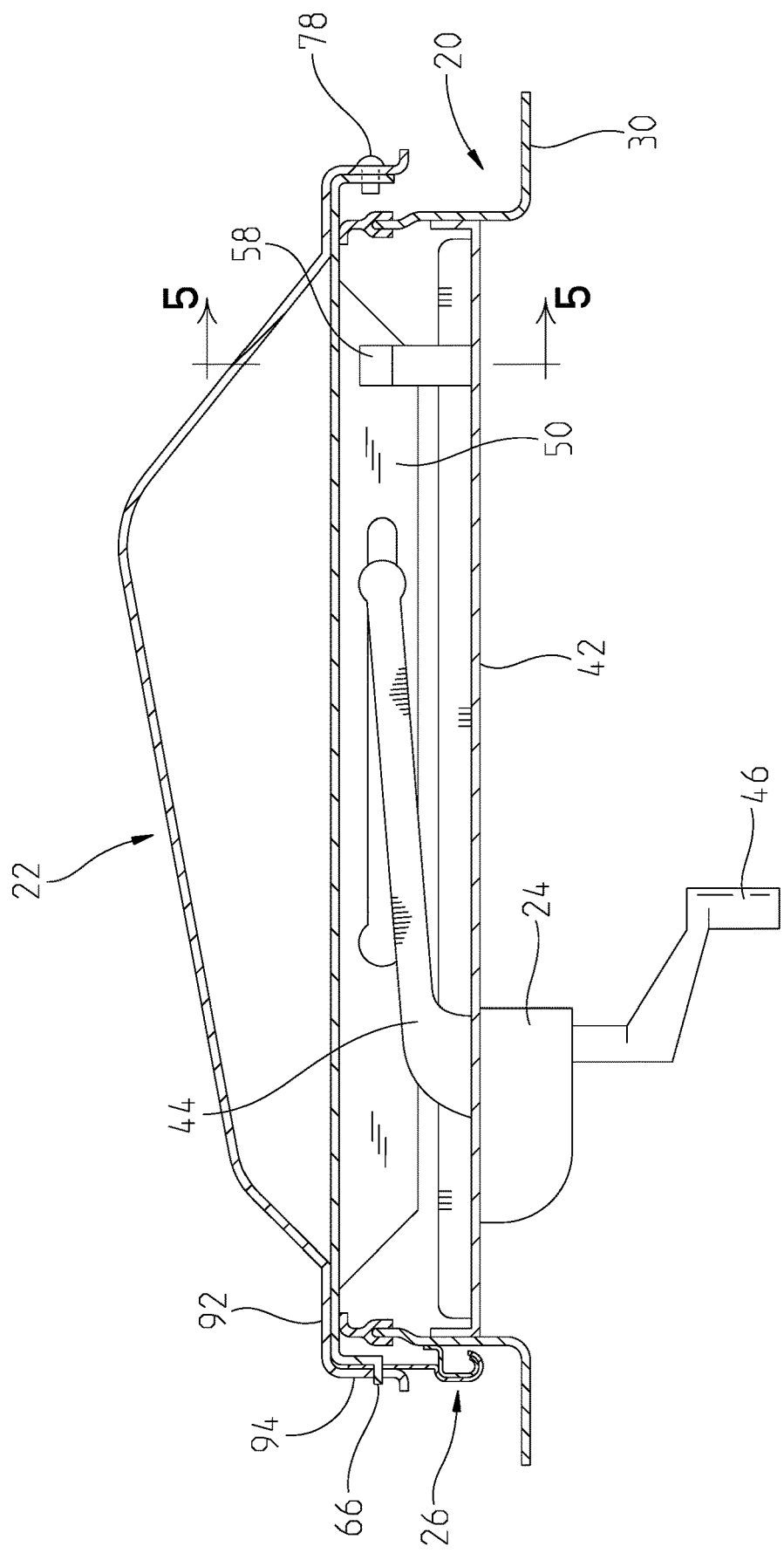
FIG. 3 is a side section view 2-2 of the vent in FIG. 1 in the closed position.
Figure 5:
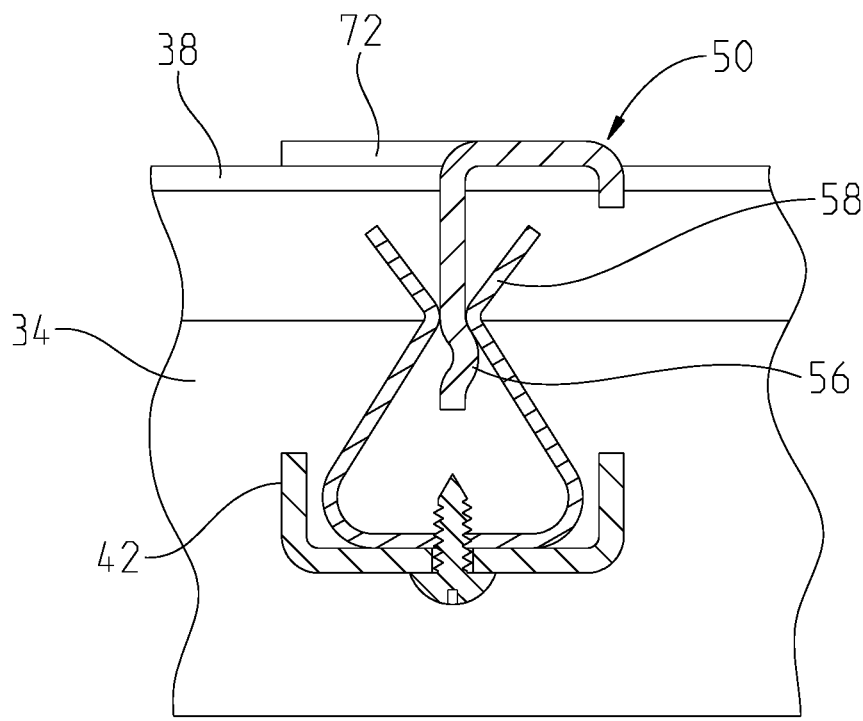
FIG. 5 is a partial section view 5-5 of the vent in FIG. 3.

The moving bar 50 has overhanging portions 60, 70 on each end. The forward overhanging portion 60 is closest to the hinge 26 and includes a flat portion 62, and offset portion 64, and an alignment tab 66. The flat portion 62 makes direct contact with the resilient seal 38 in the closed position. The flat portion 62 extends to the offset portion 64, which terminates at the alignment tab 66. The alignment tab 66 extends outwardly and mates with an alignment slot 84 in the cover 22 when the cover is installed. This is shown in FIGS. 2-3. As can be seen in the same FIGS., the alignment tab 66 is offset from the hinge 26, and more importantly, the hinge axis 28. The rearward overhanging portion 70 has a flat portion 72, an offset portion 74, and threaded holes 76. As with the flat portion 62, the flat portion 72 makes direct contact with the seal 38 in the closed position. The threaded holes 76 receive fasteners 78 to retain the cover 22. The moving bar 50 has a catch 56 that mates with a spring clip 58 in the closed position. As shown in FIG. 5, the spring clip 58 is affixed to the fixed bar 42 and is located distant from the hinge 26. As the moving bar 50 approaches the closed position, the catch 56 is centered between the legs of the clip 58 and begins to displace them outwardly. As the catch 56 passes through the narrowest area of the legs of the clip 58, the spring pressure from the legs then urges the catch 56 further towards the fixed bar 42. In the closed position, the spring clip 58 applies biased pressure to the catch 56 to urge the moving bar towards the 50 the fixed bar 42.

Figure 6:
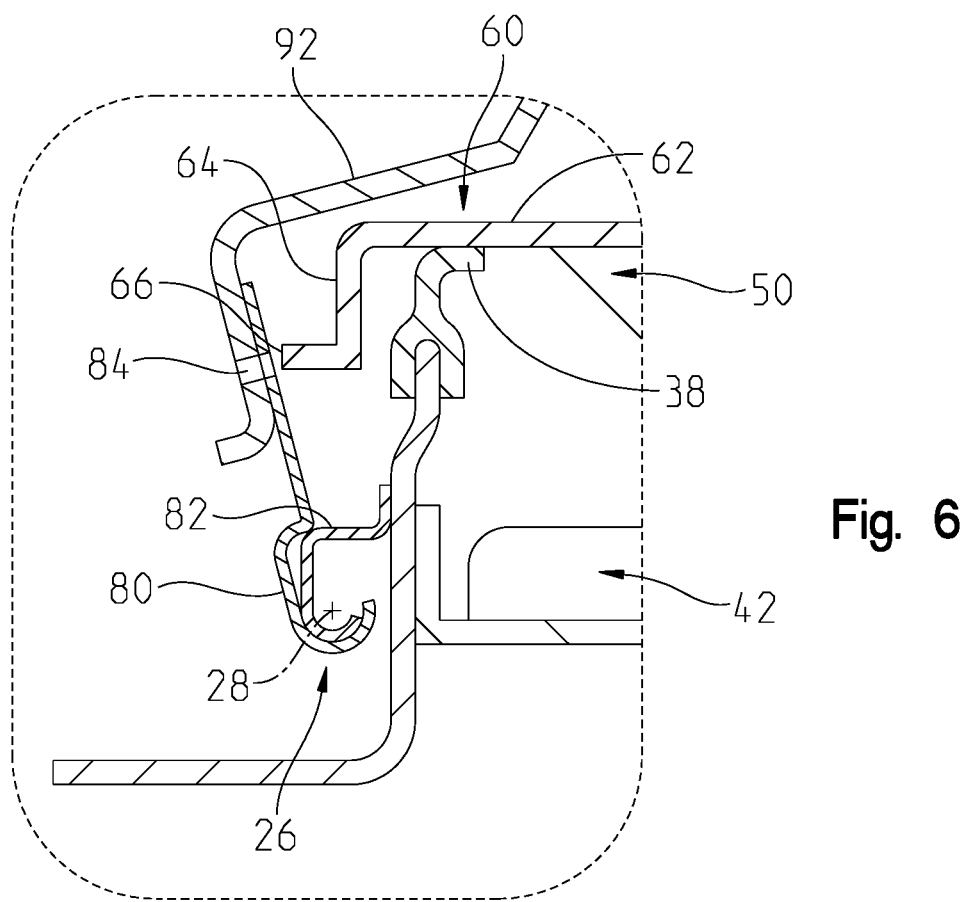
FIG. 6 is an enlarged partial view 6 of the hinge area in FIG. 4.

The cover 22, commonly formed from a translucent or material that allows some light to pass through, has a moving hinge half 80 affixed thereto. As can be seen in FIG. 6, the alignment slot 84 extends through the moving hinge half 80 to provide strength and support. The moving hinge half 80 mates with a fixed hinge half 82 that is affixed to the base 20 to form the hinge 26. Each hinge half 80, 82 has a C-shaped portion that interlock to form the hinge 26. In the closed position, the hinge halves 80, 82 are tightly mated, as shown in FIG. 3. In the opened position, the hinge halves 80, 82 remain mated, but not as tightly mated as the closed position. This is shown in FIG. 2. The cover 22 has a dome portion 90 which is surrounded by a flat sealing portion 92. The sealing portion 92 mates with the resilient seal 38 in the closed position. Surrounding the sealing portion 92 is a skirt 94. The moving hinge half 80 is permanently affixed to the skirt 94. The skirt 94 provides a drip edge for precipitation, and also shields the mating area of the resilient seal 38 and sealing portion 92. The skirt 94 is important while the vehicle is in motion, as any rain would be driven by the wind directly into the mating area where any minute gap could create a leak into the interior living space. The skirt 94 hangs down and shields the mating area. The skirt 94 also has holes 96 to receive fasteners 78 that thread into the threaded holes 76 to secure the moving bar 50. This is shown in FIG. 2. The hinge halves 80, 82 are shown as C-shaped that are more tightly mated in the closed position, but other hinges are contemplated, provided one hinge half can be decoupled from the other hinge half once the moving bar 50 is not attached to the cover 22.

Figure 4:
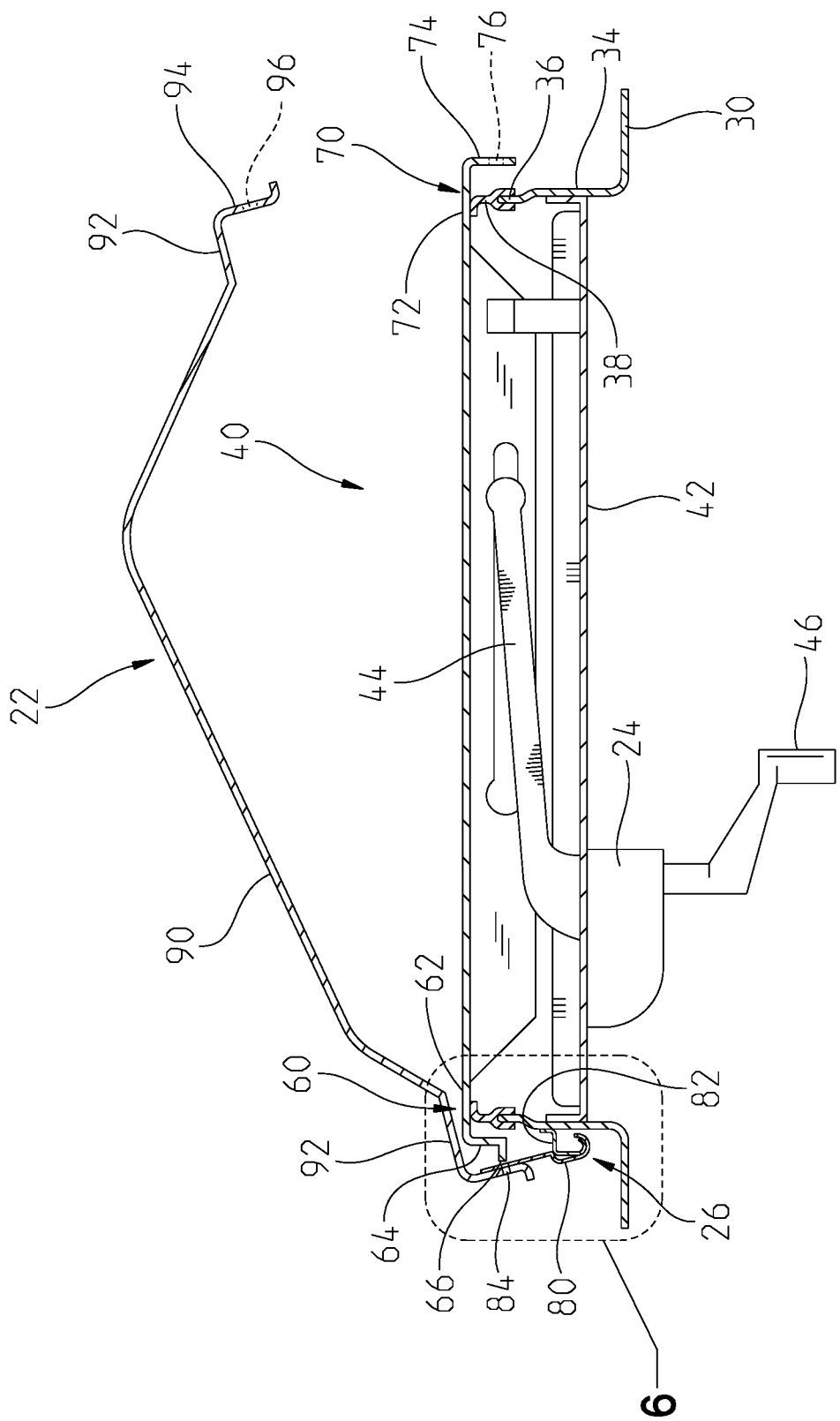
FIG. 4 is a side section view 2-2 of the vent in FIG. 1 during the process of replacing the cover.

A screen 100 is commonly affixed to the base 20, shown in FIG. 4. In the opened position, the screen 100 blocks debris, insects, and other unwanted things from entering the living space. The screen 100 has a frame 102 and a mesh 104. A hole 106 allows the handle 46 to pass through for moving the mechanism 24.

Normally, the vent 10 is in the closed position, as shown in FIG. 3, with the cover 22 in biased contact with the resilient seal 38 and catch 56 secured by the spring clip 58. To open, the user turns the handle 46, which begins to rotate the actuating arm 44. This drives the moving bar 50 upwardly, causing the catch 56 to disengage from the spring clip 58. As the user continues to turn the handle 46, the cover 22 pivots about the hinge 26 and the pin 48 slides in the channel 52. Returning the vent 10 to the closed position is the reverse of opening, where the handle 46 is rotated in the opposite direction, and the cover 22 moves closer to the base 20. Near the closed position, the catch 56 engages the spring clip 58 and is then drawn closed by the spring clip 58 and actuating arm 44.

The cover 22 can be replaced without moving the mechanism 24. Removing or loosening of the mechanism 24 is also not required. To replace the cover 22, the user removes the fasteners 78 and pivots the cover 22 away from the base 20 to a position where the alignment tab 66 is no longer located in the alignment slot 84. This is shown in FIGS. 4 and 6. At that point, the cover 22 is only connected to the base 20 at the hinge 26. The cover 22 is then slid along the axis 28 of the hinge 26 until the two components are separated. The user does not need to move the mechanism from the closed position to remove the cover 22. The new replacement cover looks identical to the cover 22 as shown in the FIGS. To install the new cover 22, the user slides the hinge half 80 to mate with the hinge half 82 and continues sliding until the alignment slot 84 is aligned with the alignment tab 66. The user then pivots the cover 22 towards the closed position and aligns the holes 96 to the threaded holes 76. At that time, the alignment tab 66 should protrude through the alignment slot 84, as shown in FIG. 3. The mating of the alignment tab and slot prevent movement between the moving bar 50 and cover 22 when the mechanism moves the cover 22 between the opened and closed position. Because the cover 22 is secured to the moving bar 50 only through the alignment tab 66 and fasteners 78, removal only requires the removal of the fasteners 78 to disengage the cover 22 from the base 20.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A vent for mobile living quarters comprising:
   a base having a mounting flange surrounding an upstanding wall, said upstanding wall terminating at a top edge, a resilient seal affixed to said top edge, said upstanding wall surrounding an opening, a fixed bar extending between opposing portions of said upstanding wall and interrupting said opening, a fixed hinge half affixed to said upstanding wall;
   a mechanism affixed to said fixed bar and having an actuating arm movable between a closed and opened position when a handle on said mechanism is rotated;
   a moving bar having a forward overhanging portion extending from one end and a rearward overhanging portion extending from the other end, said forward overhanging portion having an alignment tab, said rearward overhanging portion having a threaded hole to receive a fastener, said overhanging portions extending beyond said opening in said base, said moving bar having a channel slidably coupled to said actuating arm;
   a cover having a dome portion, a sealing portion surrounding said dome portion, and a skirt extending from said sealing portion in a direction opposite said dome portion, a moving hinge half affixed to said skirt, said moving hinge half mateable with said fixed hinge half and pivotable about a hinge axis adjacent to a position spaced from said upstanding wall, said skirt having an alignment slot receiving said alignment tab, said alignment slot is offset from said hinge axis, said skirt having a hole located opposite said alignment slot and aligned with said threaded hole;
   said fastener extending through said hole in said skirt and threaded into said threaded hole to affix said moving bar to said cover;
   said cover and said moving bar is movable between an opened and closed position with respect to said mechanism, said closed position defined by said sealing portion in biased contact with said resilient seal, said opened position defined by said sealing portion spaced from said resilient seal; and
   wherein said cover is replaceable when said mechanism and said moving bar is in said closed position by removing said fastener and pivoting said cover away from said moving bar about said hinge axis to a position where said alignment tab is not mated to said alignment slot, said moving hinge half is slidable along said fixed hinge half when said alignment tab is not mated to said alignment slot and when said mechanism and moving bar are in said closed position.

2. The vent in claim 1, further comprising a spring clip affixed to said fixed bar, said moving bar having a catch for mating with said spring clip when said cover is in said closed position.

3. The vent in claim 1, wherein said forward overhanging portion has a flat portion extending to an offset portion, said alignment tab located on said offset portion.

4. The vent in claim 1, wherein said rearward overhanging portion has a flat portion extending to an offset portion, said threaded hole located on said offset portion.

5. The vent in claim 1, wherein said moving hinge half is only slidable along said fixed hinge half when said cover is not in said closed position.

6. The vent in claim 1, wherein said alignment slot extends through said moving hinge half, said alignment tab extends through said alignment slot in said skirt and said moving hinge half.

7. A vent for mobile living quarters comprising:
a base having a mounting flange surrounding an upstanding wall, a resilient seal affixed to said upstanding wall, said upstanding wall surrounding an opening, a fixed bar extending between opposing portions of said upstanding wall, a fixed hinge half affixed to said base;
a mechanism affixed to said fixed bar and having an actuating arm movable between a closed and opened position;
a moving bar connected to said mechanism, said moving bar having a forward overhanging portion extending from one end and a rearward overhanging portion extending from the other end, said forward overhanging portion having an alignment tab, said rearward overhanging portion having a threaded hole to receive a fastener, said moving bar having a channel slidably receiving said actuating arm;
a cover having a moving hinge half affixed thereto, said cover having an alignment slot receiving said alignment tab, said cover having a hole located oppositely said alignment slot and aligned with said threaded hole on said moving bar;
said fastener extending through said hole in said cover and threaded into said threaded hole to secure said cover to said moving bar;
said cover and said moving bar is movable between an opened and closed position with said mechanism, said closed position defined by a portion of said cover in biased contact with said resilient seal, said opened position defined by said cover spaced from said resilient seal; and
wherein said cover is replaceable when said moving bar is in said closed position by removing said fastener and pivoting said cover and said moving hinge half to a position where said alignment tab is not mated to said alignment slot, said moving hinge half is slidable along said fixed hinge half when said alignment tab is not mated to said alignment slot and said mechanism is in said closed position.

8. The vent in claim 7, further comprising a spring clip affixed to said fixed bar, said moving bar having a catch for mating with said spring clip when said cover is in said closed position.

9. The vent in claim 7, wherein said cover moves between said open and said closed positions about a hinge axis, said alignment slot offset from said hinge axis.

10. The vent in claim 7, wherein said forward overhanging portion has a flat portion extending to an offset portion, said alignment tab located on said offset portion.

11. The vent in claim 7, wherein said rearward overhanging portion has a flat portion extending to an offset portion, said threaded hole located on said offset portion.

12. The vent in claim 7, wherein said moving hinge half is only slidable along said fixed hinge half when said cover is not in said closed position.

13. The vent in claim 7, wherein said cover has a dome portion, a sealing portion surrounding said dome portion, and a skirt extending from said sealing portion in a direction opposite said dome portion.

14. The vent in claim 7, wherein said alignment slot extends through said moving hinge half, said alignment tab extends through said alignment slot in said cover and said moving hinge half.

15. A method for replacing a cover for a vent, wherein said vent having a base with a mounting flange surrounding an upstanding wall, a resilient seal affixed to said upstanding wall, said upstanding wall surrounding an opening, a fixed bar extending between opposing portions of said upstanding wall, a fixed hinge half affixed to said base, a mechanism affixed to said fixed bar having an actuating arm movable between a closed and opened position, a moving bar having a forward overhanging portion extending from one end and a rearward overhanging portion extending from the other end, said forward overhanging portion having an alignment tab, said rearward overhanging portion having a threaded hole to receive a fastener, said moving bar having a channel slidably coupled to said actuating arm, a moving hinge half affixed to said cover, said cover having an alignment slot receiving said alignment tab, said cover having a hole located oppositely said alignment slot and aligned with said threaded hole, said fastener extending through said hole in said cover and threaded into said threaded holes, said method comprising:
removing said fastener to disconnect said rearward overhanging portion from said cover;
pivoting said cover from said moving bar to disengage said alignment slot from said alignment tab;
leaving said moving bar coupled to said actuating arm;
sliding said moving hinge half of said cover along said fixed hinge half of said base to separate said cover from said base;
sliding a replacement cover to engage a moving hinge half of said replacement cover into said fixed hinge half until an alignment slot of said replacement cover is aligned to said alignment tab;
pivoting said replacement cover towards said moving bar to engage said alignment slot of said replacement cover with said alignment tab;
pivoting said replacement cover towards said closed position until said threaded hole is aligned with a hole in said replacement cover; and
installing said fastener to affix said rearward overhanging portion to said replacement cover.

16. The method of claim 15, wherein said cover moves between open and closed positions about a hinge axis, said alignment slot offset from said hinge axis.

17. The method of claim 15, wherein said forward overhanging portion has a flat portion extending to an offset portion, said alignment tab located on said offset portion, said rearward overhanging portion has a flat portion extending to an offset portion, said threaded hole located on said offset portion.

18. The method of claim 15, wherein said alignment slot extends through said moving hinge half, said alignment tab extends through said alignment slot in said cover and said moving hinge half.

* * * * *